(12) United States Patent
Schroeyers et al.

(10) Patent No.: US 9,879,160 B2
(45) Date of Patent: Jan. 30, 2018

(54) PRESSURE-SENSITIVE HOT MELT ADHESIVE COMPOSITIONS

(75) Inventors: Jurgen Schroeyers, Helchteren (BE); Eddy Swiggers, Kapelle-op-den-Bos (BE)

(73) Assignee: ExxonMobil Chemical Patents Inc., Baytown, TX (US)

(*) Notice: Subject to any disclaimer, the term of this patent is extended or adjusted under 35 U.S.C. 154(b) by 534 days.

(21) Appl. No.: 12/880,762

(22) Filed: Sep. 13, 2010

(65) Prior Publication Data

US 2011/0104487 A1 May 5, 2011

Related U.S. Application Data

(60) Provisional application No. 61/256,124, filed on Oct. 29, 2009.

(51) Int. Cl.
| | | |
|---|---|---|
| *C09J 153/00* | (2006.01) | |
| *C09J 123/14* | (2006.01) | |
| *C09J 4/06* | (2006.01) | |
| *C09J 7/02* | (2006.01) | |
| *C09J 123/10* | (2006.01) | |
| *C09J 153/02* | (2006.01) | |
| *C08L 23/14* | (2006.01) | |
| *C08L 57/00* | (2006.01) | |

(52) U.S. Cl.
CPC ............. *C09J 123/14* (2013.01); *C09J 4/06* (2013.01); *C09J 7/021* (2013.01); *C09J 123/10* (2013.01); *C09J 153/02* (2013.01); *C08L 23/14* (2013.01); *C08L 57/00* (2013.01); *C09J 2423/00* (2013.01); *C09J 2453/00* (2013.01); *Y10T 428/2878* (2015.01); *Y10T 428/2883* (2015.01)

(58) Field of Classification Search
CPC .... C09J 2201/606; C09J 7/0246; C09J 7/045; C09J 123/14; B32B 27/08; B32B 27/32

USPC ......................................................... 428/355
See application file for complete search history.

(56) References Cited

U.S. PATENT DOCUMENTS

| | | | |
|---|---|---|---|
| 4,857,594 A | 8/1989 | Lakshmanan et al. | |
| 5,292,819 A | 3/1994 | Diehl et al. | |
| 5,407,715 A | 4/1995 | Buddenhagen et al. | |
| 5,523,343 A | 6/1996 | Giordano et al. | |
| 6,103,814 A | 8/2000 | vanDrongelen et al. | |
| 6,384,138 B1 | 5/2002 | Jacob et al. | |
| 6,747,114 B2 | 6/2004 | Karandinos et al. | |
| 7,009,000 B2 | 3/2006 | Bening et al. | |
| 7,560,512 B2 | 7/2009 | DuBois | |
| 7,629,278 B2 | 12/2009 | Sabbagh et al. | |
| 2003/0119972 A1 | 6/2003 | Plamthottam | |
| 2006/0229411 A1 | 10/2006 | Hatfield et al. | |
| 2006/0293424 A1 | 12/2006 | Tse et al. | |
| 2007/0021566 A1 | 1/2007 | Tse et al. | |
| 2009/0133834 A1 | 5/2009 | Lechat et al. | |
| 2010/0047499 A1* | 2/2010 | Braksmayer et al. | 428/40.5 |
| 2013/0130027 A1 | 5/2013 | Curry et al. | |
| 2015/0104639 A1 | 4/2015 | Schroeyers et al. | |

FOREIGN PATENT DOCUMENTS

| | | | |
|---|---|---|---|
| JP | 08-012952 | | 1/1996 |
| WO | 2007/011460 | | 1/2007 |
| WO | WO2008008420 | * | 1/2008 |

OTHER PUBLICATIONS

U.S. Appl. No. 12/772,811, filed May 3, 2010 entitled "Polyolefin Compositions for Coating Applications".

* cited by examiner

*Primary Examiner* — Samir Shah

(57) ABSTRACT

The present invention is related to pressure-sensitive hot melt adhesive compositions and their applications. In particular, the adhesive compositions described herein comprise a block copolymer component, a hydrocarbon tackifier resin component, and a propylene-based polymer component.

18 Claims, No Drawings

US 9,879,160 B2

PRESSURE-SENSITIVE HOT MELT ADHESIVE COMPOSITIONS

CROSS REFERENCE TO RELATED APPLICATIONS

This application claims priority to U.S. Provisional Application Ser. No. 61/256,124 filed Oct. 29, 2009, the disclosure of which is fully incorporated herein by reference.

FIELD OF THE INVENTION

The present invention is related to pressure-sensitive hot melt adhesive compositions and their applications. In particular, the adhesive compositions described herein comprise a block copolymer component, a hydrocarbon tackifier resin component, and a propylene-based polymer component.

BACKGROUND OF THE INVENTION

Pressure-sensitive adhesives are well known, and are used in a wide variety of label and tape applications. Such adhesives may be applied to, for example, paper, plastic films, metal, etc. to form the aforementioned labels or tapes. These labels and tapes may be affixed to a wide variety of substrates, and in many cases are removable or repositionable.

Pressure-sensitive hot melt adhesive systems are known in the art and consist of tackified thermoplastic elastomers such as styrenic block copolymers together with tackifying resin(s) and generally some plasticizing oil, an antioxidant and optionally fillers. Styrenic block copolymers containing polystyrene and polybutadiene blocks and/or polyisoprene blocks are particularly useful. These materials are generally available as pure triblocks, (sometimes referred to as SIS and SBS copolymers), and diblocks (sometimes referred to as SI and SB copolymers or SIB copolymers). The materials are also available as mixtures of diblock and triblock materials (sometimes referred to as SIS+SI and SIS+SB).

It is known to use diblock/triblock blends as the elastomeric component in hot-melt pressure-sensitive adhesives. It is further known that adhesive properties and viscosity can be controlled by varying the diblock-to-triblock ratio, varying the styrene content, varying the polymer molecular weight, and varying the block molecular weights within the polymers. The melt viscosity can also be controlled by the addition of plasticizing oils and varying the molecular weight of the polymers.

One drawback of such adhesive formulations is that, in order to achieve the desired processability and removability of a product, many additives such as silicone oils, waxes, and other fillers must be added. Incorporation of such additives leads to increased expense, and also limits the equipment that may be used to manufacture the adhesive compositions.

U.S. Pat. No. 5,523,343 discloses a pressure sensitive hot melt adhesive composition comprising a blend of a radial SB copolymer and a SIS block copolymer. The composition also includes a tackifier resin and plasticizer oils.

U.S. Pat. No. 6,384,138 discloses a hot melt pressure sensitive adhesive composition for use with oriented polypropylene films which comprises a blend of styrene-isoprene-styrene (SIS) and styrene-butadiene-styrene (SBS) block copolymers combined with a blend of hydrocarbon resins.

U.S. Application Pub. No. 2009/0133834 discloses radial block copolymer compositions and pressure-sensitive adhesive compositions based thereon.

It would be useful, therefore, to develop an adhesive composition for use with labels and/or tapes having the properties of a typical block copolymer-based adhesive at a lower cost and with increased processability. The invention described herein accomplishes this by blending a block copolymer component with a hydrocarbon tackifier resin component and a propylene-based polymer component.

SUMMARY OF THE INVENTION

The present invention is directed to pressure-sensitive hot melt adhesive compositions and their commercial applications. In one or more embodiments, the adhesive compositions comprise at least one block copolymer component, at least one hydrocarbon tackifier resin component, and at least one propylene-based polymer component. In some embodiments, the adhesive compositions may further comprise at least one process oil component. The adhesive compositions described herein combine excellent viscosity and shear properties while improving the performance of tapes, labels, and other applications in which the adhesives are employed. In further embodiments, end use applications relating to adhesive articles such as adhesive tapes and labels are contemplated, which comprise a substrate and one or more pressure-sensitive hot melt adhesive compositions of the type described herein. The resulting adhesive tapes demonstrate good removability and repositionability, along with exceptional peel strength on a variety of surfaces.

DETAILED DESCRIPTION OF THE INVENTION

The pressure-sensitive hot melt adhesive compositions of the present invention comprise a block copolymer component, a hydrocarbon tackifier resin component, and a propylene-based polymer component. In one or more embodiments, the adhesive compositions may also comprise a process oil component. Further embodiments of the adhesive compositions described herein and their individual components are described in greater detail below.

As used herein, the term "copolymer" is meant to include polymers having two or more monomers, optionally with other monomers, and may refer to interpolymers, terpolymers, etc. The term "polymer" as used herein includes homopolymers and copolymers.

Block Copolymer Component

The adhesive compositions described herein comprise a block copolymer component such as a styrenic block copolymer. The phrase "block copolymer" is intended to include any manner of block copolymer having two or more polymer chains attached at their ends, including but not limited to diblock, triblock, and tetrablock copolymers. "Block copolymer" is further meant to include copolymers having any structure known to those of skill in the art, including but not limited to linear, radial or multi-arm star, multi-branched block copolymers, and random block copolymers. "Linear block copolymers" comprise two or more polymer chains in sequence. "Radial block copolymers" (or "star block copolymers") comprise more than two linear block copolymers attached at a common branch point. "Styrenic block copolymers" comprise a block copolymer having at least one block that is substantially styrene. While the block copolymers may be linear or radial, combinations of linear and radial block copolymers are particularly useful. The block copolymers may or may not be hydrogenated.

A linear diblock copolymer would traditionally have the formula (A-B) wherein A is substantially a vinyl aromatic block and B is substantially a polydiene block. The polydiene in the B block may be a conjugated diene block or the B block may be a combination of conjugated dienes such as polyisoprene and polybutadiene either in block or random order.

A linear diblock (A-B) may also include a random block copolymer wherein the B block may include styrene randomly inserted into the B block in addition to the one or more dienes. Examples of such random block copolymers having styrene included in the B block include Solprene™ 1205 (a linear random-block styrene-butadiene copolymer having a 25% bound styrene content, 17.5% present as a polystyrene block, and a specific gravity of 0.93) available from Dynasol Elastomeros S.A. de C.V. of Mexico.

The vinyl aromatic block may be derived from styrene, alpha-methylstyrene, p-methylstyrene, o-methylstyrene, p-tert-butylstyrene, 2,4-dimethylstyrene, diphenylethylenes including stilbene, vinyl naphthalene, vinyltoluene (a mixture of meta- and para-isomers of methylstyrene), vinylxylene and combinations thereof. Of these vinyl aromatic monomers, styrene is preferred, although the vinyl aromatic block may comprise styrene and less than 5 wt % of the other vinyl aromatic monomers previously mentioned.

A linear styrene-diene-styrene triblock copolymer would traditionally have the formula (A-B-A) wherein A is substantially a vinyl aromatic block and B is substantially a polydiene block. The polydiene in the B block may be a conjugated diene block or the B block may be a combination of conjugated dienes such as polyisoprene and polybutadiene either in block or random order. In another embodiment, the B block may also include styrene randomly inserted into the B block in addition to the one or more dienes to form a random block copolymer.

Suitable block copolymers include linear block copolymers of styrene and one or more conjugated dienes such as SI (styrene-isoprene), SIS (styrene-isoprene-styrene), SB (styrene-butadiene), SBS (styrene-butadiene-styrene), SIB (styrene-isoprene-butadiene), or combination thereof.

Block copolymers comprising tetrablock or pentablock copolymers selected from A-B-A-B tetrablock copolymers or A-B-A-B-A pentablock copolymers and the like are also suitable such as SISI (styrene-isoprene-styrene-isoprene), SISB, SBSB, SBSI, SIBS, ISISI, ISISB, BSISB, ISBSI, BSBSB, and BSBSI block copolymers.

In one or more embodiments, the linear block copolymer includes a linear polymer of the formula S—I—S or S—B—S wherein S is substantially a polystyrene block, I is substantially a polyisoprene block, and B is substantially a polybutadiene block. The styrene content of the SBS block copolymer is typically from about 10 to about 45 wt %, or from about 15 to about 35 wt %, or from about 20 to 30 wt %. The SIS block copolymers may be prepared by well known anionic solution polymerization techniques using lithium-type initiators such as disclosed in U.S. Pat. Nos. 3,251,905 and 3,239,478, which are hereby incorporated by reference in their entireties. The SIS and the SBS copolymer may be a pure triblock (one having less than 0.1 wt % of diblock polymer, preferably 0% diblock polymer), or may contain from about 0.1 to about 85 wt %, or from about 0.1 to about 75 wt %, or from about 1 to about 65 wt %, or from about 5 to about 50 wt %, or from 5 to 25 wt %, or from 10 to 20 wt % diblock copolymer having the structure S—I or SB, respectively. The SI or SB diblock may be present as a residue from the manufacture of the triblock copolymer or may be separately blended with the triblock as a further technique for achieving target polystyrene content or modifying the cohesive properties of the composition. In one or more embodiments, the number average molecular weight of the diblock SI copolymers may range from about 100,000 to about 250,000.

The SBS or SIS linear block copolymers employed herein may have a number average molecular weight (Mn) (determined by GPC) in the range of from about 50,000 to 500,000, or from about 100,000 to about 180,000, or from about 110,000 to about 160,000, or from about 110,000 to about 140,000.

Linear SBS and SIS block copolymers of the type described herein are available commercially and are prepared in accordance with methods known in the art. Examples of SBS and SIS copolymers useful in the practice of this invention include those available under the trade names Vector (from Dexco Polymers LLP), Kraton (from Kraton Polymers LLC), Europrene (from Polimeri), and Finaprene (from Total PetroChemicals). Particularly useful triblock copolymers include, but are not limited to, Vector™ 4111A, 4113A, 4114A, 4211A, 4215A, 4411A, 2518A, 2518P, 4461, 6241, 7400, and 8508A; Kraton D 1102, D 4141, D 4158, Europrene SOL T 166, and Finaprene 411. In one or more embodiments, the SIS block copolymers used in this invention may have a melt flow rate in the range of from about 5 to 40 g/10 min., as measured by ASTM D 1238 using condition G (200° C., 5 kg weight).

In one or more embodiments, the block copolymer component may be a radial block copolymer. A radial block copolymer would traditionally have the notation $(A-B)_nX$ wherein A is substantially a vinyl aromatic block such as styrene, B is substantially a polydiene block, X is the residue of a multifunctional coupling agent used in the production of the radial block copolymer, and n is an integer of from about 2 to about 10, from 3 to 8, from 3 to 7, from 4 to 6, or 4. In the same or other embodiments, the radial block copolymer component may have a linear block copolymer content of from about 0 to about 85 wt % such as a diblock copolymer. Linear block content may be determined by GPC, and may be manipulated via the reactor settings employed to produce the block copolymer component. Linear block content may also be adjusted after production by blending an additional quantity of linear block material into the block copolymer component. Linear block content in the radial block copolymer may be from 5 to 90 wt %, 15 to about 90 wt %, or from about 20 to about 85 wt %, or from about 25 to about 80 wt %.

The production of radial block copolymers often results in an amount of block copolymer which is linear in structure, along with the radial structure. Also, a linear block copolymer may be added to the radial block copolymer to modify the properties of the block copolymer. These block copolymers may be referred to in terms of their linear block content such as a diblock content, wherein the linear block content (expressed as a percentage) refers to the amount of copolymer which is linear in structure. The remaining portion of the block copolymer not included in the linear block percentage is therefore radial in structure. Accordingly, the radial block copolymer $(A-B)_n$ will typically comprise a linear component (A-B) wherein A is substantially a vinyl aromatic block and B is substantially a polydiene block. A typical notation for such a radial/linear combination is $(A-B)_n/A-B$. The vinyl aromatic content (e.g. styrene) of the $(A-B)_n$ block copolymer or the $(A-B)_n/A-B$ block copolymer composition is typically from about 10 to about 45 wt %, or from about 15 to about 35 wt %, or from about 17 to 22 wt %.

Suitable block copolymer compositions comprising radial and linear block copolymers such as $(SI)_n/(SI)$ may have a diblock content of from about 15 to about 90 wt %, or from about 20 to about 85 wt %, or from about 25 to about 80 wt %. Other suitable block copolymers include $(SB)_n/(SB)$ which may have a diblock content of from about 5 to about 90 wt %, or from about 5 to about 50 wt %, or from about 5 to about 25 wt %, or from about 5 to about 15 wt %.

These radial block copolymers are multi-armed, and may have, for example, three, four, five, or more arms extending from a central point in a radial fashion, wherein one end of each arm is connected to the other arms at the center of the copolymer structure via a coupling agent or coupling group. Coupling agents are well known in the art, and any suitable multifunctional coupling agent may be used to form the radial block copolymers described herein. Suitable coupling agents may include, for example, silanes, liquid and metallic multifunctional acrylates and methacrylates, functionalized polybutadiene resins, functionalized cyanurate, allyl isocyanurate, and diesters.

In some embodiments, the radial block copolymer component is a styrenic block copolymer chosen from a styrene-isoprene $(SI)_n$ block copolymer or a styrene-butadiene $(SB)_n$ block copolymer. In other embodiments, the radial block copolymer may comprise a mixture of a radial and linear block copolymer such as $(SI)_n/(SI)$ or $(SB)_n/(SB)$.

The radial $(A-B)_n$ or $(A-B)_n/A-B$ block copolymers employed herein may have a number average molecular weight (Mn) (determined by GPC) in the range of from about 50,000 to 500,000, or from about 70,000 to about 250,000, or from about 90,000 to about 175,000, or from about 90,000 to about 135,000. Specifically, radial SI or SB copolymers useful in the practice of the invention may have a molecular weight (Mn) of from about 180,000 to about 250,000.

The radial block copolymers or radial and linear block copolymer compositions useful for the present invention may additionally have a melt flow rate (MFR) (200° C., 5 kg) from about 5 to about 35 g/10 min, or from about 10 to about 30 g/10 min, or from about 12 to about 25 g/10 min. Further, the copolymers may have a specific gravity from about 0.90 to about 0.97, or from about 0.92 to about 0.95; a molecular weight (Mn) from about 125,000 to about 300,000, or from about 150,000 to about 275,000, or from about 175,000 to about 250,000; and/or a Shore A hardness (ASTM D 2240) from about 35 to about 55, or from about 40 to about 50. Suitable radial block copolymer compositions with linear block copolymer such as $(SI)_n/(SI)$ include, but are not limited to, those available under the trade names Vector 4230 and Vector 4186A from Dexco Polymers LLP. Suitable radial block copolymer compositions with linear block copolymer such as $(SB)_n/(SB)$ include, but are not limited to, those available under the trade names Vector 2411 and 2411P from Dexco Polymers LLP.

In other embodiments, radial styrenic triblock copolymers and other styrenic block copolymers suitable for use in the present invention include those described in U.S. Application Pub. No. 2009/0133834, which is incorporated by reference herein in its entirety.

The radial or linear A-B block copolymers may comprise a blend of two or more different A-B copolymers, which may have the same or different styrene content, and may be blended to a ratio in the range of from 10:1 to 1:10 parts by weight. The use of two different A-B block copolymers may offer improved cohesive strength and allow more precise tailoring of the polystyrene content.

In another embodiment, the B block (diene block) may be hydrogenated. For example, hydrogenating the B block (diene block) of an A-B diblock or an A-B-A triblock may produce a B block comprising at least one olefin wherein the olefin is chosen from ethylene, propylene, and butylene. Suitable block copolymers are the Kraton™ G Series polymers including SEP (styrene-ethylene-propylene), SEBS (styrene-ethylene-butylene-styrene) and SEPS (styrene-ethylene-propylene-styrene). Examples of the Kraton™ G series that are commercially available include Kraton™ G1702H (diblock) and Kraton™ A1535H (triblock).

In one or more embodiments, the pressure-sensitive hot melt adhesive compositions described herein may comprise from about 25 to about 65 wt %, or from about 30 to about 60 wt %, or from about 35 to about 55 wt % of the block copolymer component.

Hydrocarbon Tackifier Component

In one or more embodiments of the present invention, the adhesive compositions described herein comprise a hydrocarbon tackifier resin component, which may in turn comprise one or more hydrocarbon tackifier resins.

Hydrocarbon tackifier resins suitable for use in the present invention include, but are not limited to, aliphatic hydrocarbon resins, at least partially hydrogenated aliphatic hydrocarbon resins, aliphatic/aromatic hydrocarbon resins, at least partially hydrogenated aliphatic aromatic hydrocarbon resins, aromatic resins, at least partially hydrogenated aromatic hydrocarbon resins, cycloaliphatic hydrocarbon resins, at least partially hydrogenated cycloaliphatic resins, cycloaliphatic/aromatic hydrocarbon resins, cycloaliphatic/aromatic at least partially hydrogenated hydrocarbon resins, polyterpene resins, terpene-phenol resins, rosin esters, rosin acids, grafted resins, and mixtures of two or more of the foregoing. The hydrocarbon tackifiers may be polar or apolar.

In one embodiment, the tackifier component may comprise one or more hydrocarbon resins produced by the thermal polymerization of cyclopentadiene (CPD) or substituted CPD, which may further include aliphatic or aromatic monomers as described later. The hydrocarbon resin may be a non-aromatic resin or an aromatic resin. The hydrocarbon resin may have an aromatic content between 0% and 60%, preferably between 1% and 60%, or between 1% and 40%, or between 1% and 20%, or between 10% and 20%. In further embodiments, the hydrocarbon resin may have an aromatic content between 15% and 20%, or between 1% and 10%, or between 5% and 10%.

In another embodiment, the tackifier component may comprise hydrocarbon resins produced by the catalytic (cationic) polymerization of linear dienes. Such monomers are primarily derived from Steam Cracked Naptha (SCN) and include $C_5$ dienes such as piperylene (also known as 1,3-pentadiene). Polymerizable aromatic monomers can also be used to produce resins and may be relatively pure, e.g. styrene, -methyl styrene, or from a $C_9$-aromatic SCN stream. Such aromatic monomers can be used alone or in combination with the linear dienes previously described. "Natural" monomers can also be used to produce resins, e.g., terpenes such as α-pinene or β-carene, either used alone or in high or low concentrations with other polymerizable monomers. Typical catalysts used to make these resins are $AlCl_3$ and $BF_3$, either alone or complexed. Mono-olefin modifiers such as 2-methyl, 2-butene may also be used to control the molecular weight distribution (MWD) of the final resin. The final resin may be partially or totally hydrogenated as described in further detail below.

As used herein, aromatic content and olefin content are measured by $^1$H-NMR, as measured directly from the $^1$H NMR spectrum from a spectrometer with a field strength greater than 300 MHz, preferably 400 MHz. Aromatic content is the integration of aromatic protons versus the total number of protons. Olefin proton or olefinic proton content is the integration of olefinic protons versus the total number of protons.

In one or more embodiments, the resin may be at least partially hydrogenated or substantially hydrogenated. As used herein, "at least partially hydrogenated" means that the material contains less than 90% olefinic protons, or less than 75% olefinic protons, or less than 50% olefinic protons, or less than 40% olefinic protons, or less than 25% olefinic protons. As used herein, "substantially hydrogenated" means that the material contains less than 5% olefinic protons, or less than 4% olefinic protons, or less than 3% olefinic protons, or less than 2% olefinic protons. The degree of hydrogenation is typically conducted so as to minimize and preferably avoid hydrogenation of the aromatic bonds.

In one or more embodiments, hydrocarbon tackifier resins described herein may be uniquely characterized as totally or substantially amorphous in nature. This means that a glass transition temperature ($T_g$) is detectable, e.g., by Differential Scanning Calorimetry (DSC) but they have no melting point ($T_m$). To characterize these resins, it is generally accepted to use a test that roughly correlates with $T_g$, such as softening point (SP), which provides approximate, but not exact, values. The softening point (SP) of the resins is measured by a ring-and-ball softening point test according to ASTM E-28.

In some embodiments, the hydrocarbon resin may have a softening point of from about 50° C. to about 140° C., or from about 60° C. to about 130° C., or from about 70° C. to about 120° C., or from about 80° C. to about 110° C.

Typically, in one or more embodiments of the invention, the hydrocarbon resin has a number average molecular weight (Mn) from about 400 to about 3000, a weight average molecular weight (Mw) from about 500 to about 6000, a z-average molecular weight (Mz) from about 700 to about 15,000 and a polydispersity (PD), defined as Mw/Mn, between about 1.5 and about 4. As used herein, molecular weights (number average molecular weight (Mn), weight average molecular weight (Mw), and z-average molecular weight (Mz)) are measured by size exclusion chromatography using a Waters 150 Gel Permeation Chromatograph equipped with a differential refractive index detector and calibrated using polystyrene standards. Samples are run in tetrahydrofuran (THF) (45° C.). Molecular weights are reported as polystyrene-equivalent molecular weights and are generally measured in g/mol.

In one or more embodiments of the invention, the hydrocarbon tackifier resin component may comprise one or more oligomers such as dimers, trimers, tetramers, pentamers, and hexamers. The oligomers may be derived from a petroleum distillate boiling in the range of 30-210° C. The oligomers may be derived from any suitable process and are often derived as a byproduct of resin polymerization. Suitable oligomer streams may have molecular weights (Mn) between 130-500, more preferably between 130-410, more preferably between 130 and 350, or between 130 and 270, or between 200 and 350, or between 200 and 320. Examples of suitable oligomer streams include, but are not limited to, oligomers of cyclopentadiene and substituted cyclopentadiene, oligomers of $C_4$-$C_6$ conjugated diolefins, oligomers of $C_8$-$C_{10}$ aromatic olefins, and combinations thereof. Other monomers may be present. These include $C_4$-$C_6$ mono-olefins and terpenes. The oligomers may comprise one or more aromatic monomers and may be at least partially hydrogenated or substantially hydrogenated.

In one embodiment, the oligomers may be stripped from the resin before hydrogenation. The oligomers may also be hydrogenated with the resin and then stripped from the resin, yielding a hydrogenated resin and hydrogenated oligomers. In another embodiment, at least some of the oligomers are stripped before hydrogenation and at least some hydrogenated oligomers are stripped after hydrogenation. In yet another embodiment, the hydrogenated resin/oligomers product may be further processed together as a single mixture as described below. In yet another embodiment, the oligomers can be derived from any suitable source and hydrogenated (if necessary) before grafting so that the oligomers before grafting are typically at least partially hydrogenated and preferably substantially hydrogenated.

The hydrocarbon tackifier resin component may comprise one or more hydrocarbon tackifier resins. These resins may be chosen based upon their compatibility with the one or more block copolymers which comprise the block copolymer component of the adhesive composition. For example, certain tackifier resins may be better suited for use with SIS block copolymers, while other tackifier resins may be more compatible with SBS block copolymers.

Examples of commercially available SIS compatible tackifier resins include, but are not limited to, Escorez 2203LC, Escorez 1310LC, Escorez 1304, Escorez 5380, and Escorez 5600, manufactured by ExxonMobil Chemical Company; Piccotac 1905 and Eastotac H-100, manufactured by Eastman Chemicals; Quintone D and Quintone U 185, manufactured by Nippon Zeon; Marukares R100, manufactured by Maruzen; and Wingtack Extra and Wingtack Plus, manufactured by Cray Valley.

Examples of commercially available SBS compatible tackifier resins include, but are not limited to, Escorez 2101, Escorez 5690, and Escorez 2173, manufactured by ExxonMobil Chemical Company; Regalrez 5095, Regalrez 3102, Staybelite Ester 3, and Pentalyn H, manufactured by Eastman Chemicals; Quintone U 190, manufactured by Nippon Zeon; Wingtack 86, manufactured by Cray Valley; and Sylvalite RE 885 and Sylvatac RE 85, available from Arizona Chemical.

In one or more embodiments, the pressure-sensitive hot melt adhesive compositions described herein may comprise from about 5 to about 50 wt %, or from about 10 to about 40 wt %, or from about 15 to about 35 wt % of the hydrocarbon tackifier resin component.

Propylene-Based Polymer Component

In one or more embodiments of the present invention, the adhesive compositions described herein comprise a propylene-based polymer component, which in turn comprises one or more propylene-based polymers. In some embodiments, the propylene-based polymers comprises propylene and from about 2 to about 40 wt % units derived from ethylene and/or a $C_4$-$C_{10}$ alpha-olefin. In one or more embodiments, the alpha-olefin comonomer units may derive from ethylene, 1-butene, 1-hexene, 4-methyl-1-pentene, 1-octene, and/or 1-decene. The embodiments described below are discussed with reference to ethylene as the alpha-olefin comonomer, but the embodiments are equally applicable to other propylene copolymers with other alpha-olefin comonomers, or to propylene terpolymers with ethylene and another alpha-olefin comonomer. In this regard, the copolymer may simply be referred to as propylene-based polymers with reference to ethylene as the alpha-olefin.

In one or more embodiments, the propylene-based polymers may include at least about 2 wt %, at least about 3 wt %, at least about 5 wt %, at least about 6 wt %, at least about 8 wt %, or at least about 10 wt % ethylene-derived units. In those or other embodiments, the propylene-based polymers may include up to about 40 wt %, or up to about 30 wt %, or up to about 25 wt %, or up to about 20 wt %, or up to about 18 wt %, or up to about 16 wt %, or up to about 12 wt % ethylene-derived units, where the percentage by weight is based upon the total weight of the propylene-derived and alpha-olefin derived units. Stated another way, the propylene-based polymers may include at least about 60 wt %, or at least about 70 wt %, or at least about 75 wt %, or at least about 80 wt %, or at least about 82 wt % propylene-derived units; and in these or other embodiments, the copolymers may include up to about 98 wt %, or up to about 97 wt %, or up to about 95 wt %, or up to about 94 wt %, or up to about 92 wt %, or up to about 90 wt % propylene-derived units, where the percentage by weight is based upon the total weight of the propylene-derived and alpha-olefin derived units.

The propylene-based polymers of one or more embodiments are characterized by having a single melting temperature as determined by differential scanning calorimetry (DSC). The melting point is defined as the temperature of the greatest heat absorption within the range of melting of the sample. The propylene-based polymer may show secondary melting peaks adjacent to the principal peak, but for purposes herein, these secondary melting peaks are considered together as a single melting point, with the highest of these peaks being considered the melting point (Tm) of the propylene-based polymer.

In one or more embodiments, the Tm of the propylene-based polymer (as determined by DSC) is less than about 130° C., or less than about 120° C., or less than about 110° C., or less than about 105° C., or less than about 100° C., or less than about 95° C., or less than about 90° C., or less than about 80° C., or less than about 70° C.

In one or more embodiments, the propylene-based polymer may be characterized by a heat of fusion (Hf), as determined by DSC. In one or more embodiments, the propylene-based copolymer may be characterized by a heat of fusion that is at least about 0.5 J/g, or at least about 1.0 J/g, or at least about 1.5 J/g, or at least about 3.0 J/g, or at least about 4.0 J/g, or at least about 6.0 J/g, or at least about 7.0 J/g. In these or other embodiments, the propylene-based copolymer may be characterized by a heat of fusion of less than about 75 J/g, or less than about 70 J/g, or less than about 60 J/g, or less than about 50 J/g, or less than about 45 J/g, or less than about 40 J/g, or less than about 30 J/g. The heat of fusion may be reduced by using additional comonomer, operating at higher polymerization temperatures, and/or using a different catalyst that provides reduced levels of steric constraints and favors more propagation errors for propylene insertion.

As used within this specification, DSC procedures for determining Tm and Hf include the following. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a Differential Scanning calorimeter (Perkin Elmer Pyris One Thermal Analysis System) and cooled to about −50° C. to about −70° C. The sample is heated at 10° C./min to attain a final temperature of about 200° C. The sample is kept at 200° C. for 5 minutes and a second cool-heat cycle is performed. Events from both cycles are recorded. The thermal output is recorded as the area under the melting peak of the sample, which typically occurs between about 0° C. and about 200° C. It is measured in Joules and is a measure of the heat of fusion (Hf) of the polymer. The melting point is recorded as the temperature of the greatest heat absorption with respect to a baseline within the range of melting of the sample.

The propylene-based polymer can have a triad tacticity of three propylene units, as measured by $^{13}C$ NMR, of 75% or greater, 80% or greater, 82% or greater, 85% or greater, or 90% or greater. In one or more embodiments, ranges include from about 50 to about 99%, in other embodiments from about 60 to about 99%, in other embodiments from about 75 to about 99%, in other embodiments from about 80 to about 99%, and in other embodiments from about 60 to about 97%. Triad tacticity is determined by the methods described in U.S. Patent Application Publication No. 2004/0236042. If the triad tacticity of the copolymer is too high, the level of stereo-irregular disruption of the chain is too low and the material may not be compatible and sufficiently flexible for its purpose in a coating or tie layer. If the triad tacticity is too low, the bonding strength may be too low.

In one or more embodiments, the propylene-based polymer may have a % crystallinity of from about 0.5% to about 40%, or from about 1% to about 30%, or from about 5% to about 25%, determined according to DSC procedures. Crystallinity may be determined by dividing the heat of fusion of a sample by the heat of fusion of a 100% crystalline polymer, which is assumed to be 189 joules/gram for isotactic polypropylene or 350 joules/gram for polyethylene.

In one or more embodiments, the propylene-based polymer may have a density of from about 0.85 $g/cm^3$ to about 0.92 $g/cm^3$, or from about 0.87 $g/cm^3$ to about 0.90 $g/cm^3$, or from about 0.88 $g/cm^3$ to about 0.89 $g/cm^3$ at room temperature as measured per the ASTM D-792 test method.

In one or more embodiments, the propylene-based polymer can have an melt index (MI) (ASTM D-1238, 2.16 kg @ 190° C.), of less than or equal to about 10 dg/min, or less than or equal to about 7.5 dg/min, or less than or equal to about 6.5 dg/min, or less than or equal to about 5.5 dg/min, or less than or equal to about 5 dg/min.

In one or more embodiments, the propylene-based polymer may have a melt flow rate (MFR), as measured according to the ASTM D-1238, 2.16 kg weight @ 230° C., greater than or equal to about 0.3 dg/min, or at least about 0.5 dg/min, or at least about 0.8 dg/min, or at least about 1.0 dg/min. In these or other embodiments, the melt flow rate may be equal to or less than about 2000 dg/min, or less than about 1000 dg/min, or less than about 900 dg/min, or less than about 700 dg/min, or less than about 500 dg/min, 350 dg/min, or less than about 250 dg/min, or less than about 100 dg/min.

In one or more embodiments, the propylene-based polymer may have a Mooney viscosity [ML (1+4) @ 125° C.], as determined according to ASTM D-1646, of less than about 100, or less than about 75, or less than about 50, or less than about 30.

In one or more embodiments, the propylene-based polymer can have a weight average molecular weight (Mw) of from about 5,000 to about 5,000,000 g/mole, or from about 10,000 to about 1,000,000 g/mole, or from about 20,000 to about 500,000 g/mole, or from about 50,000 to about 400,000 g/mole.

In one or more embodiments, the propylene-based polymer can have a number average molecular weight (Mn) of from about 2,500 to about 2,500,000 g/mole, or from about 5,000 to about 500,000 g/mole, or from about 10,000 to about 250,000 g/mole, or from about 25,000 to about 200,000 g/mole.

In one or more embodiments, the propylene-based polymer can have a Z-average molecular weight (Mz) of from about 10,000 to about 7,000,000 g/mole, or from about 50,000 to about 1,000,000 g/mole, or from about 80,000 to about 700,000 g/mole, or from about 100,000 to about 500,000 g/mole.

In one or more embodiments, the molecular weight distribution (MWD=(Mw/Mn)) of the propylene-based polymer may be from about 1 to about 40, or from about 1 to about 15, or from about 1.8 to about 5, or from about 1.8 to about 3.

Techniques for determining the molecular weight (Mn, Mw and Mz) and molecular weight distribution (MWD) may be found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al.), which is herein incorporated by reference for purposes of U.S. practices, and references cited therein. For example, molecular weight may be determined by size exclusion chromatography (SEC) by using a Waters 150 gel permeation chromatograph equipped with the differential refractive index detector and calibrated using polystyrene standards.

In one or more embodiments, the pressure-sensitive hot melt adhesive compositions described herein may comprise from about 5 to about 50 wt %, or from about 5 to about 25 wt %, or from about 10 to about 20 wt % of the propylene-based polymer component.

Preparation of the Propylene-Based Polymer

The triad tacticity and tacticity index of the propylene based polymer may be controlled by a catalyst which influences the stereoregularity of propylene placement, the polymerization temperature, according to which stereoregularity can be reduced by increasing the temperature, and by the type and amount of a comonomer which tends to disrupt reduce the level of longer propylene derived sequences.

Too much comonomer will reduce the crystallinity provided by the crystallization of stereoregular propylene derived sequences to the point where the material lacks strength; too little and the material will be too crystalline. The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm−1 to 4000 cm−1 is recorded and the monomer weight percent of ethylene can be calculated according to the following equation: Ethylene wt %=82.585−111.987X+30.045X2, where X is the ratio of the peak height at 1155 cm−1 and peak height at either 722 cm−1 or 732 cm−1, whichever is higher. For propylene ethylene copolymers having 75 wt % or less propylene content, the comonomer (ethylene) content can be measured using the procedure described in Wheeler and Willis.

Reference is made to U.S. Pat. No. 6,525,157, which describes test methods that are fully applicable for the various measurements referred to in this specification and claims and which contains more details on GPC measurements, the determination of ethylene content by NMR and the DSC measurements.

The catalyst may also control the stereoregularity in combination with the comonomer and the polymerization temperature. The catalyst should, however, be capable of a level of stereoregular placement, generally by suitable chirality of the catalyst.

In one embodiment, the polymer can be prepared using any single sited metallocene catalyst. Such a catalyst may be a transition metal complex generally containing a transition metal Groups 3 to 10 of the Periodic Table and at least one ancillary ligand that remains bonded to the transition metal during polymerization. Preferably the transition metal is used in a reduced cationic state and stabilized by a cocatalyst or activator.

The ancillary ligand may be a structure capable of forming a π bond such a cyclopentadienyl type ring structure (See EP129368, EP284708, Rieger EP1070087 and U.S. Pat. No. 6,559,262). The ancillary ligand may also be a pyridinyl or amide ligand (See WO2003/040201). The transition metal is preferably of Group 4 of the Periodic table such as titanium, hafnium or zirconium, which is used in polymerization in the d0 mono-valent cationic state and has one or two ancillary ligands as described in more detail hereafter. The important features of such catalysts for coordination polymerization are the ligand capable of abstraction and that ligand into which the ethylene (olefinic) group can be inserted.

The manner of activation of the single site catalyst can vary. Alumoxane and preferably methyl alumoxane can be used suitably in an amount to provide a molar aluminum to metallocene ratio of from 1:1 to 20,000:1. Higher molecular weights can be obtained using non- or weakly coordinating anion activators (NCA) derived and generated in any of the ways amply described in published patent art such as EP 277004, EP 426637, EP426638 and many others. The non-coordinating anion can be a Group 10-14 complex wherein boron or aluminum is the charge-bearing atom shielded by ligands, which may be halogenated, and especially perfluorinated. Preferably tetra-aryl-substituted Group 10-14 non-carbon element-based anion, especially those that are have fluorine groups substituted for hydrogen atoms on the aryl groups, or on alkyl substituents on those aryl groups. The non-coordinating anion may be used in approximately equimolar amounts relative to the transition metal complex, such as at least 0.25, preferably 0.5, and especially 0.8 and such as no more than 4, preferably 2 and especially 1.5. Further options are described in U.S. Pat. No. 6,048,950; WO1998/27154; U.S. Pat. No. 6,448,358; U.S. Pat. No. 6,265,212, U.S. Pat. No. 5,198,401 and U.S. Pat. No. 5,391,629.

The polymerization reaction is conducted by reacting monomers in the presence of a metallocene catalyst system described herein at a temperature of from 0° C. to 200° C. for a time of from 1 second to 10 hours. Preferably homogeneous conditions are used, such as a continuous solution process or a bulk polymerization process with excess monomer used as diluent. The continuous process may use some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used.

Optional Process Oil Component

In one or more embodiments of the present invention, one or more process oils may be added to the pressure-sensitive hot melt adhesive compositions described herein. As used herein, the term "process oil" means both petroleum derived process oils and synthetic plasticizers.

Examples of process oils suitable for use in the present invention include, but are not limited to, paraffinic or naphthenic oils such as Primol 352 or Sentinel PO 876, produced by ExxonMobil Chemical France; and Nyflex 222B, available from Nynas AB.

Further process oils suitable for use in the present invention include aliphatic naphthenic oils, white oils, and the like. Exemplary plasticizers and/or adjuvants include mineral oils, polybutenes, phthalates and the like. In one or more embodiments, the plasticizers may include phthalates such as diisoundecyl phthalate (DIUP), diisononylphthalate (DINP), dioctylphthalates (DOP), and polybutenes, such as Parapol 950 and Parapol 1300 available from ExxonMobil Chemical Company in Houston, Tex. Further useful plasticizers include those described in WO01/18109A1 and U.S. Application Pub. No. 2004/0106723, which are incorporated by reference herein.

In one or more embodiments, the pressure-sensitive hot melt adhesive compositions described herein may comprise from about 1 to about 50 wt %, or from about 5 to about 40 wt %, or from about 10 to about 35 wt %, or from about 15 to about 30 wt % of the optional process oil component.

Other Additives and Fillers

In some embodiments, one or more additional fillers or additives may be employed to achieve the properties and characteristics desired in the final adhesive formulation. Such additive and fillers are known in the art and may include, but are not limited to fillers, cavitating agents, antioxidants, surfactants, adjuvants, plasticizers, block, anti-block, colorants, color masterbatches, pigments, dyes, processing aids, UV stabilizers, neutralizers, lubricants, waxes, and/or nucleating agents. The additives may be present in any amount determined to be effective by those skilled in the art, such as for example from about 0.001 wt % to about 10 wt %.

Examples of suitable antioxidants include, but are not limited to, quinolein, e.g., trimethylhydroxyquinolein (TMQ); imidazole, e.g., zincmercapto toluoyl imidazole (ZMTI); and conventional antioxidants, such as hindered phenols, lactones, phosphates, and hindered amines. Further suitable anti-oxidants are commercially available from, for example, Ciba Geigy Corp. under the trade names Irgafos 168, Irganox 1010, Irganox 3790, Irganox B225, Irganox 1035, Irgafos 126, Irgastab 410, and Chimassorb 944.

Fillers, cavitating agents and/or nucleating agents suitable for use in the present invention may comprise granular, fibrous, and powder-like materials, and may include, but are not limited to, titanium dioxide, calcium carbonate, barium sulfate, silica, silicon dioxide, carbon black, sand, glass beads, mineral aggregates, talc, natural and synthetic clays, diatomaceous earth, and the like.

Processing aids, lubricants, waxes, and/or oils which may be employed in the adhesive compositions of the present invention include low molecular weight products such as wax, oil, or low Mn polymer, (low meaning having an Mn less than 5000, preferably below 4000, or below 3000, or below 2500). Waxes may include polar or non-polar waxes, functionalized waxes, polypropylene waxes, polyethylene waxes, and wax modifiers.

The additives described herein can be added to the blend in pure form or in master batches.

In one or more embodiments of the present invention, the adhesive compositions described herein may comprise one or more process oils, but are otherwise substantially free of silicon oils or waxes. By "substantially free of" is meant that any silicon oils or waxes in the adhesive composition are present as impurities only; no silicon oils or waxes are added to the adhesive formulation.

Preparation of the Pressure-Sensitive Hot Melt Adhesive Composition

In one or more embodiments, the components of the pressure-sensitive hot melt adhesive compositions described herein may be blended by mixing, using any suitable mixing device at a temperature above the melting point of the components, e.g., at 130 to 180° C., for a period of time sufficient to form a homogeneous mixture, normally from about 1 to about 120 minutes depending on the type of mixing device.

In the case of continuous mixing as practiced by most commercial manufacturers, a twin screw extruder may be used to mix the adhesive components. First the block copolymer and propylene-based polymer components are introduced into the extruder and mixed until the polymers have melted and are well mixed. Then the tackifiers are added, followed by any process oils which may be desired. To the extent pigments, antioxidants, fillers, or other additives are used, they are normally blended in with the block copolymer and propylene-based polymer components. The total mixing time is typically on the order of from about 1 to 5 minutes.

In the case of batch mixing, the block copolymer and propylene-based polymer components are added along with 20% of the tackifier component. When the polymers and tackifier reach a homogeneous state, the remaining tackifier component is gradually added to the mix. Once all of the tackifier component has been added and homogeneous mix is achieved, the balance of the process oil, antioxidants, fillers, and any other additives are added. The total mixing time may run for up to 120 minutes.

Applications

In one or more embodiments of the present invention, adhesive tapes may be formed which comprise a substrate coated with one or more adhesive compositions as described herein. As used herein, the term "tape" is meant generically to encompass any manner of adhesive application, including but not limited to tapes, labels, stickers, decals, packaging applications, and the like.

The adhesive compositions described herein may be applied to any substrate. Suitable substrates may include, but are not limited to, wood, paper, cardboard, plastic, plastic film, thermoplastic, rubber, metal, metal film, metal foil (such as aluminum foil and tin foil), metallized surfaces, cloth, non-wovens (particularly polypropylene spun bonded fibers or non-wovens), spunbonded fibers, cardboard, stone, plaster, glass (including silicon oxide ($SiO_x$) coatings applied by evaporating silicon oxide onto a film surface), foam, rock, ceramics, films, polymer foams (such as polyurethane foam), substrates coated with inks, dyes, pigments, PVDC and the like or combinations thereof. Additional substrates may include polyethylene, polypropylene, polyacrylates, acrylics, polyethylene terephthalate, or blends thereof. Corona treatment, electron beam irradiation, gamma irradiation, microwave or silanization may modify any of the above substrates.

The adhesive compositions of this invention may be applied to a substrate as a melt and then cooled. The adhesive composition may be applied to a substrate using conventional coating techniques such as roller coaters, die coaters and blade coaters, generally at a temperature of from about 150° C. to about 200° C. In one or more embodiments, the adhesive composition is applied to a substrate using a slot die.

A slot die is a closed system where an adhesive composition is pumped through the system via a positive displacement pump. The slot die usually includes a rotating bar at the point of the outlet of the adhesive in order to maintain a smooth surface.

The substrate should be coated with sufficient adhesive composition to provide a dry coating weight of from about 10 to about 100, or from about 10 to about 50, or from about 15 to about 25 grams per square meter (gsm).

After coating, the coated substrate is cut to the required dimension. In the manufacture of tape, the substrate is slit into strips and rolled into a finished product. The substrate may also be cut into shaped items to provide labels or medicinal tapers. In one or more embodiments, a release liner may also be employed if desired.

Properties of the Adhesive Composition

In one or more embodiments, the adhesive compositions of the present invention comprise from about 25 to about 65 wt % of the block copolymer component, from about 5 to about 50 wt % of the hydrocarbon tackifier component, and from about 5 to about 50 wt % of the propylene-based polymer component. In other embodiments, the adhesive compositions of the present invention comprise from about 30 to about 60 wt % of the block copolymer component, from about 10 to about 40 wt % of the hydrocarbon tackifier component, and from about 5 to about 25 wt % of the propylene-based polymer component. In further embodiments, the adhesive compositions of the present invention comprise from about 35 to about 55 wt % of the block copolymer component, from about 15 to about 35 wt % of the hydrocarbon tackifier component, and from about 10 to about 20 wt % of the propylene-based polymer component. In some embodiments, the addition of a process oil to the adhesive composition may be desirable. In such embodiments, the adhesive composition may comprise from about 1 to about 50 wt %, or from about 5 to about 40 wt %, or from about 10 to about 35 wt %, or from about 15 to about 30 wt % of one or more process oils.

In one or more embodiments of the present invention, the adhesive composition has a viscosity greater than about 500 mPa-s, or greater than about 1,000 mPa-s, or greater than about 5,000 mPa-s, or greater than about 10,000 mPa-s (measured at 175° C.). Viscosity may be determined via ASTM D 3236.

In one or more embodiments, the initial 180° peel strength of the adhesive tape compositions described herein when adhered to steel is less than or equal to about 10, or less than or equal to about 8, or less than or equal to about 6, or less than or equal to about 4 N/25 mm (at a coating weight of about 20 gsm). In the same or other embodiments, the initial 180° peel strength of the adhesive tape compositions described herein when adhered to glass is less than or equal to about 10, or less than or equal to about 5, or less than or equal to about 4, or less than or equal to about 3 N/25 mm (at a coating weight of about 20 gsm). In the same or other embodiments, the initial 180° peel strength of the adhesive tape compositions described herein when adhered to polyethylene film is less than or equal to about 10, or less than or equal to about 5, or less than or equal to about 3, or less than or equal to about 2 N/25 mm (at a coating weight of about 20 gsm).

In one or more embodiments, the 180° peel strength of the adhesive tape compositions described herein after one week incubation at 60° C. when adhered to steel is less than or equal to about 35, or less than or equal to about 30, or less than or equal to about 25, or less than or equal to about 20 N/25 mm (at a coating weight of about 20 gsm). In the same or other embodiments, the 180° peel strength of the adhesive tape compositions described herein after one week incubation at 60° C. when adhered to glass is less than or equal to about 30, or less than or equal to about 25, or less than or equal to about 20, or less than or equal to about 15 N/25 mm (at a coating weight of about 20 gsm). In the same or other embodiments, the 180° peel strength of the adhesive tape compositions described herein after one week incubation at 60° C. when adhered to polyethylene film is less than or equal to about 15, or less than or equal to about 10, or less than or equal to about 8, or less than or equal to about 6 N/25 mm (at a coating weight of about 20 gsm).

As used herein, the 180° peel strength of a sample is determined according to FINAT testing method 1 (FTM 1).

In one or more embodiments, the shear of the adhesive tapes described herein when adhered to steel (25 mm*25 mm, 1 kg) at room temperature (23° C.±2° C., 50%±5% RH) is greater than or equal to about 10 hours, or greater than or equal to about 15 hours, or greater than or equal to about 20 hours. As used herein, shear is determined by FINAT testing method 8 (FTM 8).

Further embodiments of the present invention are described with reference to the following lettered paragraphs:

A. A pressure-sensitive hot melt adhesive composition consisting essentially of at least one block copolymer component, at least one hydrocarbon resin tackifier component, and at least one propylene-based polymer component.

B. The adhesive composition of paragraph A, further consisting essentially of a process oil component.

C. A pressure-sensitive hot melt adhesive composition consisting of at least one block copolymer component, at least one hydrocarbon resin tackifier component, and at least one propylene-based polymer component.

D. The adhesive composition of paragraph C, further consisting of a process oil component.

E. An adhesive article comprising a) a substrate; and b) a pressure-sensitive hot melt adhesive composition consisting essentially of at least one block copolymer component, at least one hydrocarbon resin tackifier component, and at least one propylene-based polymer component.

F. The article of any paragraph E, wherein the adhesive composition further consists essentially of a process oil component.

G. An adhesive article comprising a) a substrate; and b) a pressure-sensitive hot melt adhesive composition consisting of at least one block copolymer component, at least one hydrocarbon resin tackifier component, and at least one propylene-based polymer component.

H. The article of paragraph G, wherein the adhesive composition further consists of a process oil component.

EXAMPLES

The following examples are illustrative of the invention. Materials used in the preparation of the adhesive compositions as identified in the examples are as follows:

"SBC 1" is a styrene-isoprene $(SI)_n$ block copolymer having a primarily 4-arm radial structure. SBC 1 has a diblock content of approximately 73 wt %, a styrene content of approximately 18 wt %, a Melt Flow Rate (MFR) (200° C., 5 kg) of about 23 g/10 min, and a specific gravity of about 0.93. SBC 1 is available under the trade name Vector 4186A from Dexco Polymers LP, Houston, Tex.

"SBC 2" is a styrene-isoprene $(SI)_n$ block copolymer having a primarily 4-arm radial structure. SBC 2 has a diblock content of approximately 30 wt %, a styrene content of approximately 20 wt %, a Melt Flow Rate (MFR) (200° C., 5 kg) of about 14 g/10 min, and a specific gravity of about 0.94. SBC 2 is available under the trade name Vector 4230 from Dexco Polymers LP, Houston, Tex.

"PE 1" is a propylene-ethylene elastomeric copolymer having an ethylene content of approximately 15 wt % and a Melt Flow Rate (MFR) (230° C., 2.16 kg) of approximately 18 g/10 min as determined by ASTM D-1238. PE 1 is available under the trade name Vistamaxx 6202 from ExxonMobil Chemical Company, Baytown, Tex.

"HC 1" is a cycloaliphatic hydrocarbon tackifier resin having a ring and ball softening point from about 80 to about 90° C. HC 1 is available under the trade name Escorez 5380 from ExxonMobil Chemical Company, Baytown, Tex.

"HC 2" is an aromatic modified cycloaliphatic hydrocarbon tackifier resin having a ring and ball softening point from about 100 to about 106° C. HC 2 is available under the trade name Escorez 5600 from ExxonMobil Chemical Company, Baytown, Tex.

Primol 352 is a white mineral oil comprising a purified mixture of liquid saturated hydrocarbons having a kinematic viscosity at 100° C. of approximately 8.5 mm2/s (ASTM D-445) and an average molecular weight of approximately 480 (ASTM D-2502). Primol 352 is manufactured by ExxonMobil.

Irganox 1010 is a phenolic antioxidant having a melting point from about 110° C. to about 125° C. and a density (at 20° C.) of about 1.15 g/cm3. Irganox 1010 is available from Ciba Specialty Chemicals, Switzerland.

Aerosil R974 is a hydrophobic fumed silica having a specific surface area of approximately 200 m²/g. Aerosil R974 is available from Evonik Industries, Germany.

Pressure-sensitive hot melt adhesive blend compositions were prepared according to the formulations shown in Table 1. Of the blends listed, Blends C and E represent adhesive compositions according to the invention, while Blends A, B, D, F, and G are comparative. All amounts are reported in weight percent based on the total weight of block copolymer, hydrocarbon tackifier resin, propylene-based polymer, and other components in the adhesive blend.

TABLE 1

|  | Blend A | Blend B | Blend C | Blend D | Blend E | Blend F | Blend G |
|---|---|---|---|---|---|---|---|
| SBC 1 | 50 | 55 | 35 | 50 | 35 |  |  |
| SBC 2 |  |  |  |  |  | 37 |  |
| PE 1 |  |  | 15 |  | 15 |  | 50 |
| HC 1 | 20 | 20 |  |  | 20 | 33 | 20 |
| HC 2 |  |  | 20 | 20 |  |  |  |
| Primol 352 | 30 | 25 | 30 | 30 | 30 | 15 | 30 |
| Silicone Oil |  |  |  |  |  | 5 |  |
| Irganox 1010 | 0.3 | 0.3 | 0.3 | 0.3 | 0.3 | 0.3 | 0.3 |
| Aerosil R974 |  |  |  |  |  | 2 |  |
| Wax |  |  |  |  |  | 4 |  |
| CaCO3 |  |  |  |  |  | 4 |  |

A series of adhesive labels were prepared by mixing the blend compositions as set forth in Table 1 in a two blade mixer at 145° C. for a period of 70 minutes. The composition was then heated to a temperature of 175° C. and then pumped through a coating die onto a label paper substrate. The weight of the applied coating layer ranged from about 19 to 21 gsm. After coating, the paper was laminated to a release liner and the resulting adhesive tape was wound and cut.

Performance of the adhesive tapes on a variety of substrates is reported in Table 2. As used in Table 2, "af" means that the experimental tapes exhibited adhesive failure, and "cf" means that the experimental tapes exhibited a clean break in the adhesive layer, while some adhesive remained on the surface of the substrate after the adhesive tape was removed (cohesive failure). "Fogging" means that visible adhesive residue is left behind on the substrate. "n/t" means that the particular sample was not tested.

Also represented in Table 2 is Competitive Reference 1 and Competitive Reference 2. Competitive Reference 1 is a Coated 80-FR 20 acrylic pressure sensitive adhesive supplied by Ritrama SpA. Commercial reference 2 is an adhesive label using an acrylic pressure sensitive adhesive supplied by Herma GmbH commercially available as Herma™ 10315.

TABLE 2

| | Blend ID | | | | | | | Commercial Reference 1 | Commercial Reference 2 |
|---|---|---|---|---|---|---|---|---|---|
| | A | B | C | D | E | F | G | | |
| Properties 20 Minutes After Sample Preparation | | | | | | | | | |
| 180° Peel on Steel @ 23° C. (N/25 mm) | 3.1 af | 2.4 af | 4.0 af | 2.5 af | 2.9 af | 1.0 af[1] | 0.2 af | 1.2 af | 3.5 af |
| 180° Peel on Glass @ 23° C. (N/25 mm) | 1.9 af | 0.9 af | 2.9 af | 0.8 af | 1.2 af | 0.9 af | 0.1 af | 1.0 af | 3.4 af |
| 180° Peel on Writing Paper @ 23° C. (N/25 mm)[2] | 0.9 af | 0.2 af | 0.1 af | 1.1 af | 0.1 af | 0.1 af | <0.1 af | 0.2 af | 2.0 af |
| 180° Peel on LaserJet Paper @ 23° C. (N/25 mm)[3] | 2.7 af | 2.4 af | 1.2 af | n/t | n/t | n/t | n/t | n/t | 2.0 af |
| 180° Peel on Polyethylene @ 23° C. (N/25 mm) | n/t | n/t | n/t | 1.2 af | 2.0 af | 0.6 af | n/t | n/t | 2.4 af |
| Shear at 23° C. (hrs) Steel - 25*25 mm, 1 kg | 54.7 cf | 5.4 cf | 20.5 cf | 33.2 cf | >200 | 1.0[1] | 12.3 cf | 8.7[1] | 7.6 cf |

TABLE 2-continued

| | Blend ID | | | | | | | | |
|---|---|---|---|---|---|---|---|---|---|
| | A | B | C | D | E | F | G | Commercial Reference 1 | Commercial Reference 2 |
| Properties After 1 Week Incubation at 60° C. | | | | | | | | | |
| 180° Peel on Steel @ 23° C. (N/25 mm) | 18.5[1] af | 17.0[1] af | 22.8[1] af | 7.3 af | 19.0 af | 21.7 af | 15.1[4] | 6.5[1] paper tear | 5.6[1] af |
| 180° Peel on Glass @ 23° C. (N/25 mm) | 4.7 af | 4.3 af | 17.1 af | 4.0 af | 5.0 af | 14.7 af | 16.1 af | 6.3[1] af | 3.7[1] af |
| 180° Peel on Writing Paper @ 23° C. (N/25 mm)[1] | 10.9 af | 8.2 af | 18.5 af | 6.9 af | 8.5 af | 4.1 af | 0.1 af | 2.3 af | 0.9 af |
| 180° Peel on LaserJet Paper @ 23° C. (N/25 mm) | 20.1 cf | 17.5 cf | 20.9 cf | 22.0 af | 21.4 af | 8.5 af | — | n/t | 2.1 af |
| 180° Peel on Polyethylene @ 23° C. (N/25 mm) | n/t | n/t | n/t | 4.7 af | 3.5 af | 5.1 af | n/t | n/t | 1.1 af |
| Blend Viscosity @ 175° C. (mPa-s) | 46500 | 123000 | 100000 | 39000 | 140000 | 32000 | 90000 | — | — |

[1]Fogging reported
[2]70 gsm
[3]80 gsm
[4]Anchorage failure

As shown in Table 2, the adhesive compositions according to the invention demonstrate that, when properly tackified, superior shear properties, good removability and excellent wetting of standard substrates can be noted. The adhesive compositions of the present invention also provide improved wetting of low energy surfaces (LDPE, for example). The data further shows that addition of the propylene-based polymer in the inventive compositions described herein improves internal cohesive strength of the adhesive and thereby reduces the occurrence of cohesive failure or fogging. The adhesive properties reported herein were evaluated according to FINAT testing methods (FINAT, P.O. Box 85612, 2508 CH, The Hague, The Netherlands; www.finat.com).

For purposes of convenience, various specific test procedures are identified above for determining certain properties. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A pressure-sensitive hot melt adhesive composition consisting essentially of:
    from about 30 to about 60 wt % of at least one styrenic block copolymer component;
    from about 5 to about 50 wt % of at least one hydrocarbon resin tackifier component;
    at least one process oil component; and
    from about 5 to about 25 wt % of at least one propylene-based polymer component consisting of about 60 to about 98 wt % propylene and from about 2 to about 40 wt % ethylene and/or $C_4$-$C_{10}$ alpha-olefins, and wherein the propylene-based polymer component has a melting point less than or equal to about 130° C. and a triad tacticity greater than about 75%;
    wherein the pressure-sensitive hot melt adhesive composition has an initial 180° peel strength on steel of less than or equal to about 10 N/25 mm at a coating weight of about 20 gsm; and
    wherein the styrenic block copolymer component is a styrene-isoprene block copolymer.

2. The adhesive composition of claim 1, wherein the propylene-based polymer component consists of about 75 to about 98 wt % propylene and from about 2 to about 25 wt % ethylene and/or $C_4$-$C_{10}$ alpha-olefins, and wherein the propylene-based polymer component has a melting point less than or equal to about 105° C.

3. The adhesive composition of claim 1, wherein the tackifier component has a ring-and-ball softening point of from about 50 to about 140° C.

4. The adhesive composition of claim 1, wherein the propylene-based polymer component further has a heat of fusion less than about 45 J/g.

5. The adhesive composition of claim 4, wherein the at least one block copolymer component is a radial styrene-isoprene block copolymer.

6. The adhesive composition of claim 1, wherein the propylene-based polymer component further has an MFR of from about 1 to about 900 g/10 min (230° C., 2.16 kg).

7. The adhesive composition of claim 1, wherein the composition is removable and wherein the composition is substantially free of silicon oils and waxes.

8. An adhesive article comprising:
a. a substrate; and
b. a pressure-sensitive hot melt adhesive composition consisting essentially of:
from about 30 to about 60 wt % of at least one block copolymer component;
from about 5 to about 50 wt % of at least one hydrocarbon resin tackifier component;
at least one process oil component; and
from about 5 to about 25 wt % of at least one propylene-based polymer component consisting of about 60 to about 98 wt % propylene and from about 2 to about 40 wt % ethylene and/or $C_4$-$C_{10}$ alpha-olefins, and wherein the propylene-based polymer component has a melting point less than or equal to about 130° C. and a triad tacticity greater than about 75;
wherein the pressure-sensitive hot melt adhesive composition has an initial 180° peel strength on steel of less than or equal to about 10 N/25 mm at a coating weight of about 20 gsm; and
wherein the block copolymer component is a styrene-isoprene block copolymer.

9. The article of claim 8, wherein the adhesive composition is substantially free of silicon oils and waxes.

10. The article of claim 8, wherein the article is adhesive tape, wherein the initial 180° peel strength of the tape on glass is lower than or equal to 10 N/25 mm at a coating weight of about 20 gsm.

11. The article of claim 8, wherein the article is adhesive tape, wherein the initial 180° peel strength of the tape on polyethylene film is lower than or equal to 10 N/25 mm at a coating weight of about 20 gsm.

12. The article of claim 8, wherein the shear at 23° C. on steel (25 mm*25 mm, 1 Kg) is greater than or equal to 10 hours.

13. A pressure-sensitive hot melt adhesive composition consisting essentially of:
from about 30 to about 60 wt % of at least one block copolymer component, wherein the block copolymer component is a radial styrene-isoprene block copolymer;
from about 5 to about 50 wt % of at least one hydrocarbon resin tackifier component; and
from about 5 to about 25 wt % of at least one propylene-based polymer component consisting of about 60 to about 98 wt % propylene and from about 2 to about 40 wt % ethylene and/or $C_4$-$C_{10}$ alpha-olefins, and wherein the propylene-based polymer component has a melting point less than or equal to about 130° C. and a triad tacticity greater than about 75%; and
wherein the pressure-sensitive hot melt adhesive composition has an initial 180° peel strength on steel of less than or equal to about 10 N/25 mm at a coating weight of about 20 gsm.

14. A pressure-sensitive hot melt adhesive composition consisting essentially of:
from about 30 to about 60 wt % of at least one block copolymer component;
from about 5 to about 50 wt % of at least one hydrocarbon resin tackifier component; and
from about 5 to about 25 wt % of at least one propylene-based polymer component having a heat of fusion less than about 45 J/g, wherein the propylene-based polymer component consists of about 60 to about 98 wt % propylene and from about 2 to about 40 wt % ethylene and/or C4-C10 alpha-olefins, and wherein the propylene-based polymer component has a melting point less than or equal to about 130° C., a triad tacticity greater than about 75% and an MFR of from about 1 to about 900 g/10 min (230° C., 2.16 kg);
wherein the pressure-sensitive hot melt adhesive composition has an initial 180° peel strength on steel of less than or equal to about 10 N/25 mm at a coating weight of about 20 gsm; and
wherein the block copolymer component is a styrene-isoprene block copolymer.

15. A pressure-sensitive hot melt adhesive composition consisting of:
from about 30 to about 60 wt % of at least one styrenic block copolymer component;
from about 5 to about 50 wt % of at least one hydrocarbon resin tackifier component;
at least one process oil component; and
from about 5 to about 25 wt % of at least one propylene-based polymer component consisting of about 60 to about 98 wt % propylene and from about 2 to about 40 wt % ethylene and/or $C_4$-$C_{10}$ alpha-olefins, and wherein the propylene-based polymer component has a melting point less than or equal to about 130° C. and a triad tacticity greater than about 75%;
wherein the pressure-sensitive hot melt adhesive composition has an initial 180° peel strength on steel of less than or equal to about 10 N/25 mm at a coating weight of about 20 gsm; and
wherein the styrenic block copolymer component is a styrene-isoprene copolymer.

16. An adhesive article comprising:
a. a substrate; and
b. a pressure-sensitive hot melt adhesive composition consisting of:
from about 30 to about 60 wt % of at least one block copolymer component;
from about 5 to about 50 wt % of at least one hydrocarbon resin tackifier component;
at least one process oil component; and
from about 5 to about 25 wt % of at least one propylene-based polymer component consisting of about 60 to about 98 wt % propylene and from about 2 to about 40 wt % ethylene and/or $C_4$-$C_{10}$ alpha-olefins, and wherein the propylene-based polymer component has a melting point less than or equal to about 130° C. and a triad tacticity greater than about 75;
wherein the pressure-sensitive hot melt adhesive composition has an initial 180° peel strength on steel of less than or equal to about 10 N/25 mm at a coating weight of about 20 gsm; and
wherein the block copolymer component is a styrene-isoprene copolymer.

17. A pressure-sensitive hot melt adhesive composition consisting of:
from about 30 to about 60 wt % of at least one block copolymer component chosen from a radial styrene-isoprene block copolymer and a radial styrene-butadiene block copolymer;
from about 5 to about 50 wt % of at least one hydrocarbon resin tackifier component; and
from about 5 to about 25 wt % of at least one propylene-based polymer component consisting of about 60 to about 98 wt % propylene and from about 2 to about 40 wt % ethylene and/or $C_4$-$C_{10}$ alpha-olefins, and wherein the propylene-based polymer component has a melting point less than or equal to about 130° C. and a triad tacticity greater than about 75%;

wherein the pressure-sensitive hot melt adhesive composition has an initial 180° peel strength on steel of less than or equal to about 10 N/25 mm at a coating weight of about 20 gsm; and wherein the block polymer component is a styrene-isoprene copolymer.

18. A pressure-sensitive hot melt adhesive composition consisting of:

from about 30 to about 60 wt % of at least one block copolymer component;

from about 5 to about 50 wt % of at least one hydrocarbon resin tackifier component; and from about 5 to about 25 wt % of at least one propylene-based polymer component having a heat of fusion less than about 45 J/g;

wherein the pressure-sensitive hot melt adhesive composition has an initial 180° peel strength on steel of less than or equal to about 10 N/25 mm at a coating weight of about 20 gsm; and wherein the block copolymer component is a styrene-isoprene copolymer.

\* \* \* \* \*